Patented Jan. 9, 1923.

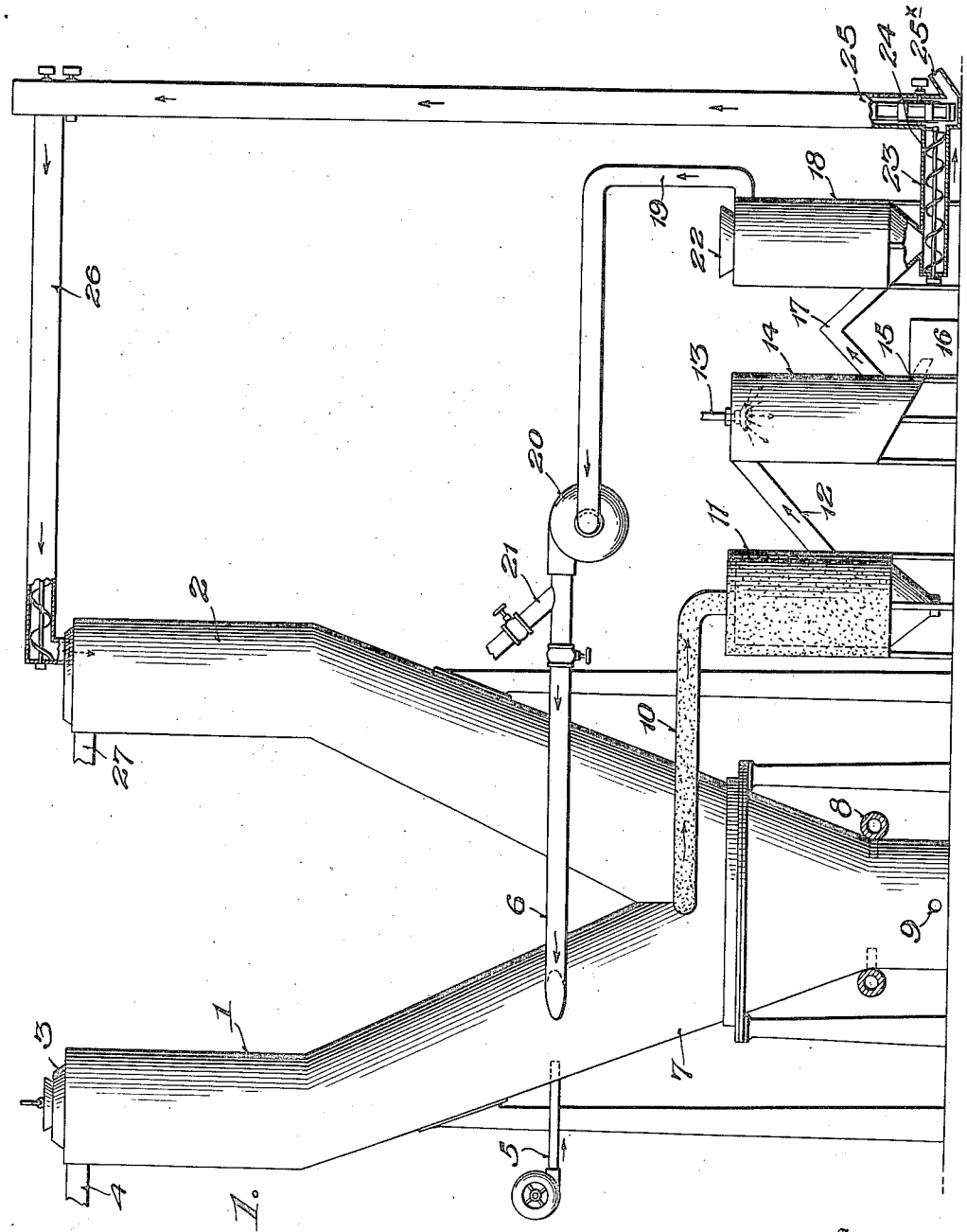

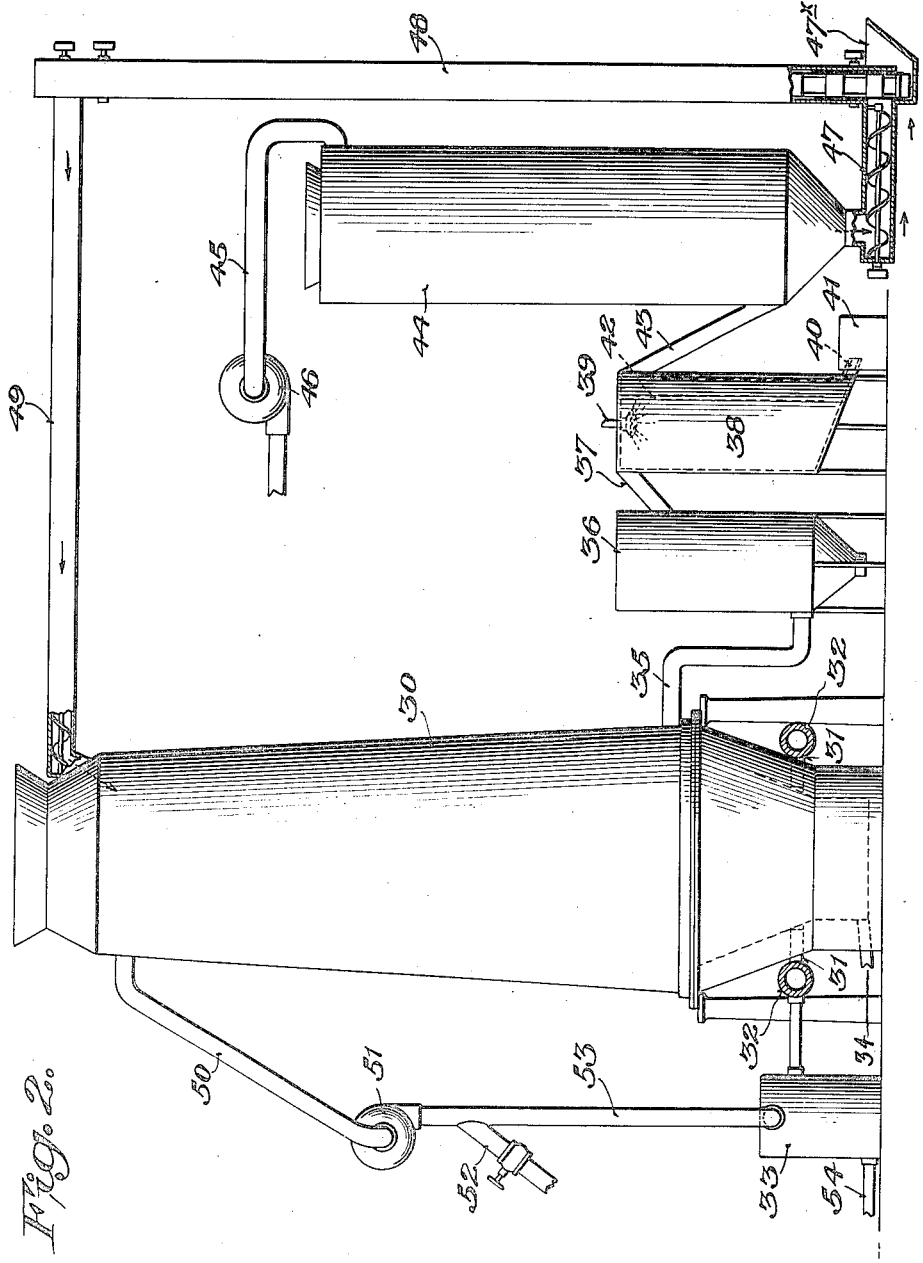

1,441,573

UNITED STATES PATENT OFFICE.

RICHARD FRANCHOT, OF NIARAGA FALLS, NEW YORK, AND KARL P. McELROY, OF WASHINGTON, DISTRICT OF COLUMBIA, ASSIGNORS TO FERRO CHEMICALS, INC., OF WASHINGTON, DISTRICT OF COLUMBIA, A CORPORATION OF DELAWARE.

MANUFACTURE OF PHOSPHORUS.

Application filed May 6, 1919, Serial No. 295,089. Renewed May 25, 1921. Serial No. 472,578.

*To all whom it may concern:*

Be it known that we, RICHARD FRANCHOT and KARL P. McELROY, citizens of the United States, residing at Niagara Falls, New York, and Washington, District of Columbia, have invented certain new and useful Improvements in the Manufacture of Phosphorus, of which the following is a specification.

This invention relates to the manuafcture of phosphorus; and it comprises a method of producing phosphorus wherein a charge containing carbon, phosphate rock and silica or silicates is heated by internal combustion with the aid of admitted air to a temperature sufficient to produce molten slag and hot producer gas containing vapors of elemental phosphorus, the admixed gases and vapors are cooled to deposit phosphorus and are then filtered through a carbon filter, the whole operation being performed under reduced pressure; and, more specifically stated, it comprises such a process wherein the silicates used in the charge are potassiferous minerals, such as feldspar, leucite, mica schist, etc., and the gases and vapors are withdrawn at a very high temperature and cooled sufficiently to deposit nitrogen and potassium compounds prior to cooling to recover the phosphorus; all as more fully hereinafter set forth and as claimed.

Ordinary bone or rock phosphate is a more or less pure tricalcium phosphate ($3CaO.P_2O_5$). On heating with silica, the $P_2O_5$ is displaced with formation of various calcium silicates, and if carbon be also present vapors of phosphorus mixed with carbon monoxid are produced by the reduction of the $P_2O_5$. While these principles are simple and well understood, much difficulty arises in putting them in practice. The two reactions require not only a very high temperature to slag the calcium silicates, but a great volume of heat for the reduction. Further, the phosphorus in the gaseous mixture coming from the zone of reduction renders the mixture quite poisonous and it is practically impossible in any simple cooling and condensation to produce a complete separation of phosphorus, phosphorus having a notable vapor tension at ordinary air temperatures. Complete removal of phosphorus from effluent gases however is required, not only for the sake of safety to the workmen but because otherwise such gases cannot well be burnt in engines, stoves, etc. For the stated reasons, it is the custom in the art to employ a sort of compromise process wherein slagging of the phosphate with silica and reduction with carbon are effected by electrical heat, thereby not only securing the high temperature required but cutting down the amount of gas accompanying the phosphorus to the minimum, there being only the CO corresponding to the P. The effluent gas is at once burnt to convert the P into $P_2O_5$ which is absorbed in water—a matter of some difficulty if strong solutions are to be formed and a limited amount of moisture used since the $P_2O_5$ is fumiform.

In the present invention phosphorus is produced in a sort of blast furnace fed with heated air and supplied with a charge of carbon, phosphate rock and silicates of such character as to give a readily fusible slag of the type of that produced in blast furnaces handling iron ores. The phosphorus is produced in the elemental form as vapors mingled with ordinary producer gas and is not burnt but is condensed as red or white phosphorus, according to the circumstances of cooling. Residual phosphorus in the gases is removed with the aid of a filter of charcoal or coke breeze, which may be returned to the furnace as part of the charge. Leakage of poisonous gases is obviated by maintaining a reduced pressure throughout the system.

In operating the stated process in an ordinary shaft furnace of the type of a slagging producer or blast furnace, the upgoing gases carrying phosphorus pass through the descending charge giving a certain amount of preheat, the amount of this preheat of course depending upon the temperature at which the gases are withdrawn. Ordinarily it is better not to withdraw them at a temperature much below 400° C. and they may, in certain cases, be withdrawn at a temperature much above this.

In so operating, the heat available for performing the process is of course the margin between the amount of heat developed in the oxidation of carbon to CO and the amount which is necessary to keep the materials at a slagging temperature in the base, a temperature of, say, around 1200° to 1400° C. This margin is however ample to afford a substantial production of phosphorus and in so operating one of the products is a rich producer gas which may be used for ordinary gas purposes, filtration through an adsorbing filter of charcoal or coke breeze being sufficient to withdraw whatever phosphorus is in it. It may, for example, be used for furnace heating, for engines, etc. Some fraction of it may be used in stoves for preheating the blast. In cooling the gas-vapor mixture some of the heat withdrawn may be transferred to the air used for the blast. Where however the production of phosphorus is the main object and production of producer gas is not desirable, it is more advantageous to use also what may be called the $CO_2$ heat; the gas formed in the reducing zone and rich in CO being burnt in contact with incoming materials to afford preheat, or some of it being so burnt. In burning to CO carbon yields about 30 per cent of the total heat, while in burning CO to $CO_2$ the remaining 70 per cent is evolved. In the method of operation just stated, therefore, a much higher utilization of the heat, from a standpoint of making phosphorus, may be obtained. It is not practicable to burn the gas from the reduction zone in contact with the whole charge, since the charge comprises carbon in the form of coke or charcoal, but it is practicable to burn it in contact with the phosphate and the flux used for slagging and afterwards add the carbon. In so doing, the $CO_2$ heat is added to the charge and made available in the reduction zone.

In forming the charge, any of the ordinary phosphatic raw materials, such as pebble phosphate, bone phosphate, rock phosphate, boneblack, apatite, etc., may be used. Where the $CO_2$ heat is used, it is found advantageous to use the coarser grades of material to give a pervious charge. As the fluxing materials, it is found better to use a silicate rather than free silica in the form of sand and the like. Sand has the disadvantage that it does not flux readily with the phosphate and produces, if used alone, the difficulty fusible calcium silicates. Kieselguhr and other forms of amorphous silica are better as regards ready combination and formation of calcium silicates but also give high melting slag. By the use of various earthy silicate materials, such as clay, or rocky materials, such as granite, gneiss, etc., there is obtained the advantage of more readily fusible compound silicates of the nature of those usually produced in blast furnace slags. There is however the production of much more slag than where silica alone is used; but the advantage of ready fusibility outweighs this. Clay furnishes alumina and silica in combined form, giving a slag similar to that of the iron blast furnace; and one which can be readily handled. Clay displaces $P_2O_5$ efficiently. The more bases there are in the fluxing material, however, other things being equal, the more readily fusible and the more readily handled is the slag. Manganese is a particularly good base for promoting ready slagging. Iron cannot well be used since to the extent that it is present a ferrophosphorous is produced with a concomitant disappearance of phosphorus. If production of ferrophosphorus is desired, it may of course be made; but iron cannot well be used for promoting fusibility of the slag.

Where silicates containing potash are employed and the gases are withdrawn at a high temperature, there is the possibility of obtaining potash-containing materials as valuable by-products. Assuming feldspar to be used as a flux, for example, its silica operates to liberate phosphoric acid, which is then reduced to phosphorus and its potash is displaced by the lime, the potash being also reduced and forming potassium as vapor. To some extent the potassium combines with the phosphorus to form phosphid; to some extent it forms cyanid with the nitrogen of the blast and to some extent it forms various compound materials containing nitrogen, phosphorus and carbon. If the gases be withdrawn at a temperature above, say, 1200° C., these various potassium compounds go forward as vapors or fumes and may be condensed by lowering the temperature, say, to 800° or 900° C., giving a valuable by-product which may be used for fertilizer purposes after appropriate treatment to convert the cyanid into ammonia compounds and the potassium and phosphorus into oxidized bodies.

In operating in this manner the feldspar may be simply mingled with the phosphate rock and used as a flux, the gases from the reducing zone being withdrawn at a high temperature and sent through a dust chamber where they are cooled sufficiently to drop their dust and the compounds mentioned. The excess phosphorus remaining in the gases may then be removed in the manner above stated.

For furnishing the carbon, any ordinary type of fixed fuel, say anthracite, coke, charcoal, etc., may be used. Within limits, the richer in ash the fuel is, the better for the present purposes. For example, high-ash anthracites are quite suitable for the present purposes, the ash giving a good slag with the phosphate and liberating $P_2O_5$ and P in the manner described.

In the accompanying illustration are shown, more of less diagrammatically, certain types of apparatus within the present invention and capable of use in the performance of the described process. In this showing—

Figure 1 is a view, partly in elevation and partly in vertical section, of a form of apparatus applying combustion heat to the mineral matters of the charge; and Figure 2 is a similar view of an apparatus not employing combustion preheating.

In the showing of Figure 1, elements 1 and 2 are, respectively, twin shafts or conduits for carrying the charge to the reaction zone, the refractory mineral matters going through 1 and the fuel through 2. Shaft 1 is provided with feeding device 3, outlet 4 for products of combustion, and means 5 for introducing air at a low point in the shaft. Near the point of air introduction is conduit 6 for introducing combustible gas. As shown, the gas is introduced more or less tangentially. The two shafts come together into a common reaction chamber 7 provided near its base with air tuyeres 8 for introducing hot blast and slag notch 9 for removing slag. An intense heat, sufficient to form and melt slag develops in the immediate vicinity of the tuyeres 8, this heat being due to the semi-combustion of carbon to carbon monoxid. Phosphorus is formed in this hot zone by the reducing action of the carbon. The hot gases and vapors pass upward through the charge, giving up much of their heat thereto. A proportion of these gases and vapors, which are still very hot, is withdrawn by conduit 10 and taken to cooling, quieting and dust-collecting chamber 11. Another portion of the hot gases ascends through shaft 1 and serves for preheating therein as later explained. Cooled and dust-free gas leaves through conduit 12 and is sprayed with water from rose 13 in phosphorus chamber 14. Condensed phosphorus passes with the water through outlet 15 into a sealed chamber 16. The gas with traces of phosphorus, passes through conduit 17 to charcoal or coke filter 18 where residual phosphorus is removed by adsorption. The filtered gas passes through 19 to suction fan 20 adapted to maintain suction on the whole line. Such portion of the gas, which is a very rich gas, as may be desired for other purposes, is withdrawn through valved conduit 21. The rest of the gas passes by the conduit (6), already mentioned, to the preheating chamber (1). The charcoal or coke used in the filter may be renewed from time to time or continuously through inlet 22 and removed by outlet conduit 23 provided, as shown, with conveyor 24. From this outlet, conveyors 25 and 26 take the phosphorus-containing carbon to the fuel column (2). Gas outlet 27, which may be connected to any suitable suction device, removes any gases which may pass upward through the charge and aids in maintaining reduced pressure therein, preventing escape of noxious gases. These upwardly passing gases coming from the hot zone give up their heat to the carbon in shaft 2.

In the showing of Figure 3, element 30 is a device in general like a blast furnace or slagging gas producer, being a vertical tower of any suitable materials, provided with boshes and with air tuyeres 31, supplied through bustle pipe 32 from stove checkers, one of which is diagrammatically shown as 33. Slag notch 34 provides for the discharge of molten slag. Hot gases and phosphorus vapors are withdrawn by conduit 35 from the hot zone of the furnace in such quantity as may be desired and sent to cooling, quieting and dust-removing chamber 36. From this chamber the purified gases go through 37 to phosphorus-condensing chamber 38, where phosphorus is removed by cooling with water from rose 39. The phosphorus and water pass through 40 into collecting chamber 41. As shown this chamber 38 contains a depending diaphragm 42 to enable the withdrawal of gases from a point near the bottom. The cooled gas, still containing a little phosphorus vapor, passes through 43 to charcoal or coke filter 44. Passing through this filter, the gas is taken by conduit 45 and fan 46 to a suitable point of use (not shown). The charged carbon is taken by conveyor 47 to elevator 48 and cross conveyor 49 by which it is discharged into the shaft. Such of the gas produced in the furnace as is not withdrawn at the lower outlet for the purpose of recovering phosphorus passes up through the charge, preheating the same, and finally passes away at 50, fan 51 being used to produce suction. Such portion of the gas as is not desired for heating the air blast may be taken to a suitable point of use through valved pipe 52. The residue is taken through 53 to the stove checker (33). Air is supplied to the stove through 54.

In the operation of the structure of Figure 1, a charge of phosphate rock, which is advantageously rather coarse, is supplied through inlet 3. There is no danger in this operation since the waste gases at this point do not contain phosphorus and moreover some suction is exercised by 4, which may be connected to a suitable chimney or stack (not shown). With the phosphate rock is supplied the required amount of silica or silicate. It is better to use a silicate and a silicate of such composition as will give, with the lime of the phosphate, a slag of the ordinary blast furnace type. If the silicate be one which, like feldspar, contains potash, the possibility of recovering a valuable by-product is offered. In using feldspar, a slag of the desired type is obtained and potash is recovered as hereinafter pointed out. Ordinary clay may be used as a fluxing means. The charge is preheated by internal combustion. For this purpose, air is introduced at 5, burning gases ascending from 7 and gas introduced by 6. The relative amounts of gas from these two sources may be as desired. Both gas and air may be introduced at this point under some pressure but this is immaterial, since free phosphorus does not occur in the shaft above. The preheated and very hot materials pass down into the boshes of the reaction chamber, being there joined by carbon from shaft 2. Any suitable fuel may be used in 2, but it is desirable to have one low in volatile matter, such as anthracite, coke or charcoal. A high-ash anthracite is desirable since the ash is useful in slagging the lime of the phosphate. However, where potassiferous silicates are to be used for the purpose of recovering potash, obviously a low-ash fuel is desirable. Charcoal is a highly desirable fuel for the present purposes. Coke breeze is also a good fuel. It is not desirable that the charge in 2 shall be too permeable, since in practice movement of the gases upward is not desirable. It is desirable to maintain some suction in the shaft 2. The fuel, phosphate and slagging material join in reaction chamber 7, where high heat is created by the aid of the hot air blast from 8. The result is the production of a slag which is drawn off at 9 in the usual manner and of very hot producer gas (nitrogen and CO), which, for the most part, leaves through 10, although an adjusted proportion may be allowed to flow upward through 1 for combustion with the air introduced at 5. Any phosphorus passing upward in 1 is burnt and collected by the charge and is not lost. If the charge contains any notable amount of potash or soda, more or less cyanid is formed under the conditions prevailing in the hot zone of the furnace and this cyanid passes forward with the vapors of phosphorus and producer gas through 10. Ordinarily, however, there is also the production of potassium phosphid and various complex compounds containing potassium, phosphorus, nitrogen and carbon. The gas is always accompanied by considerable flying dust. In chamber 11 the phosphids, cyanids, etc., are condensed and deposited, together with whatever dust may be in the gas. Phosphorus does not condense at high temperatures and it goes forward with the gas through 12 to 14, where it is, for the most part, condensed by water from 13. The gas, however, still contains a little phosphorus whatever the temperature of the cooling water, phosphorus having, as stated, a notable vapor tension at low temperatures. The amount carried forward by the gas is not great, but it is sufficient to make the gas quite dangerous to workmen, as well as, in most cases, self-inflaming on contact with air. This contained phosphorus is however readily removed. Charcoal and coke breeze remove it readily. For this reason, the gas is pressed through 17 to carbon filter 18, where it is freed of residual phosphorus. The gas thus purified is taken by 19 and 20 to any desired point of use. This gas, being formed in contact with carbon at a high temperature, is a very rich gas containing little $CO_2$. Where potash is recovered as part of the operation, the gases leave the furnace at a temperature of 1200° to 1400° C. and are substantially destitute of $CO_2$. This rich gas furnishes a valuable by-product of the present operation. The charcoal containing adsorbed phosphorus is used in the furnace and the phosphorus is not lost.

In Figure 2, the operation is parallel, save that the phosphate is not preheated by combustion and most of the gas made in the operation is used for other purposes. The modification of this figure is particularly useful where a rich producer gas is desired. In this structure, the charge moves down through shaft 30 and is slagged and reduced in the boshes, giving a mixture of gases and vapors which pass through 35 into 36 where potassium compounds and cyanids are removed as before. A small portion of the gas is allowed to ascend through 30 for preheating and serves by combustion in the stoves 33 for preheating the air introduced as a hot blast. The bottom gas, after being freed from phosphorus, may be used in any manner desired.

In both forms of apparatus the pressure is maintained below atmospheric pressure at all points in the apparatus where vapors of phosphorus occur and in both the gas is filtered through an absorbent filter prior to being used for any purpose.

If desired, the fuel may be added to either form of apparatus with the upgoing carbon from the filter by means of the side inlet $25^x$ or $47^x$ shown at the base of the elevating conveyor. Where extra heat is desired in the bosh region or where the use of the desired amount of fine fuel would make the charge too impermeable and in some cases where fine phosphate is used, more or less, or even all, of the fuel necessary for the operation may be added in the bosh region by means of inlets (not shown) adjacent to the boshes. Fine fuel or gas or oil, when used, may be blown in by the customary means used when firing with these materials.

What we claim is:—

1. In the manufacture of phosphorus, the process which comprises slagging a phosphate and reducing with carbon at a high temperature, removing and cooling resultant gases and vapors to condense phosphorus therefrom and filtering residual gases through a carbon filter, the whole operation being conducted under a pressure less than atmospheric.

2. In the manufacture of phosphorus, the process which comprises blasting a charge containing a phosphate, a silicate and carbon with hot air, cooling resultant gases and vapors to condense out phosphorus and filtering residual gas through a carbon filter.

3. In the manufacture of phosphorus the process which comprises blowing air into a preheated charge containing a phosphate and fluxing silicate and carbon, the air being sufficiently heated to produce slagging temperatures in said mixture, removing resulting gases and vapors and cooling to condense free phosphorus therefrom.

4. In the manufacture of phosphorus the process which comprises slagging and reducing a preheated phosphate with a preheated fluxing silicate and with carbon by the aid of combustion of preheated carbon under gas producer conditions with hot air blast, preheating said solid materials by a regulated portion of the resulting phosphorus-carrying gases and recovering phosphorus from another portion of said gases.

In testimony whereof, we affix our signatures hereto.

R. FRANCHOT.
K. P. McELROY.